United States Patent
Odaohhara et al.

(10) Patent No.: US 7,024,574 B2
(45) Date of Patent: Apr. 4, 2006

(54) METHOD AND STRUCTURE FOR SWITCHING BETWEEN TWO BATTERY UNITS FOR DRIVING AN ELECTRICALLY DRIVEN DEVICE

(75) Inventors: Shigefumi Odaohhara, Yamato (JP); Akiyoshi Tanaka, Yokohama (JP)

(73) Assignee: Lenovo (Singapore) PTE LTD, Singapore (SG)

(*) Notice: Subject to any disclaimer, the term of this patent is extended or adjusted under 35 U.S.C. 154(b) by 291 days.

(21) Appl. No.: 10/248,906

(22) Filed: Feb. 28, 2003

(65) Prior Publication Data
US 2003/0167415 A1 Sep. 4, 2003

(30) Foreign Application Priority Data
Mar. 1, 2002 (JP) .............................. 2002-056560

(51) Int. Cl.
G06F 1/26 (2006.01)
(52) U.S. Cl. ....................................... 713/324; 713/300
(58) Field of Classification Search ................ 713/300; 320/132, 150, 106, 121; 307/46; 324/426
See application file for complete search history.

(56) References Cited

U.S. PATENT DOCUMENTS

| 5,243,269 | A | * | 9/1993 | Katayama et al. | ........... 320/126 |
| 5,300,874 | A | * | 4/1994 | Shimamoto et al. | ......... 320/106 |
| 6,157,166 | A | * | 12/2000 | Odaohhara et al. | ......... 320/121 |
| 6,232,748 | B1 | * | 5/2001 | Kinoshita | .................... 320/132 |
| 6,624,635 | B1 | * | 9/2003 | Lui | ............................. 324/426 |
| 6,727,602 | B1 | * | 4/2004 | Olson | .......................... 307/46 |

FOREIGN PATENT DOCUMENTS

| JP | 04-054621 | | 2/1992 |
| JP | 04-331391 | | 11/1992 |
| JP | 05-111169 | | 4/1993 |
| JP | 05-289784 | | 5/1993 |
| JP | 08-054967 | | 2/1996 |
| JP | 09-224335 | * | 2/1996 |
| JP | 08-171942 | | 7/1996 |
| JP | 11-252812 | | 9/1999 |
| JP | 2000-195560 | | 7/2000 |
| JP | 2000-294298 | | 10/2000 |
| JP | 2001-102092 | | 4/2001 |
| JP | 2001-169468 | | 6/2001 |
| JP | 2001-250588 | | 9/2001 |

* cited by examiner

Primary Examiner—Chun Cao
(74) Attorney, Agent, or Firm—William N. Hogg (57) ABSTRACT

Electric apparatus, computer apparatus, controller, and battery switching method and program is provided to prevent a system shutdown caused by a reduction of electric power from a battery. A computer apparatus is constructed to be able to accept and be powered by a rechargeable main battery and a rechargeable sub-battery. An embedded controller in the computer apparatus monitors a remaining capacity at a pre-specified temperature of the sub-battery under discharge by receiving information from CPU. When the monitored temperature exceeds a predetermined temperature and when the monitored remaining capacity becomes less than a predetermined capacity, the embedded controller receives electric power from the main battery by switching the power supply circuit to provide power from the main battery instead of the sub-battery.

15 Claims, 7 Drawing Sheets

PRIOR ART

Figure 7

METHOD AND STRUCTURE FOR SWITCHING BETWEEN TWO BATTERY UNITS FOR DRIVING AN ELECTRICALLY DRIVEN DEVICE

BACKGROUND OF THE INVENTION

The present invention relates to an electric apparatus such as a notebook PC (notebook personal computer) and in particular to an electric apparatus to which a charge-discharge battery can be connected.

Secondary batteries, which can be repeatedly reused by recharging after they are discharged, are widely used in electric apparatuses such as notebook PCs, for example. Nickel-cadmium batteries (nicad batteries), lithium ion batteries, and the like are typically used as the secondary batteries. Also, lithium polymer batteries, which are safe and suitable for slim designs, will come into widespread use.

An electric apparatus such as a notebook PC uses as its secondary battery a main battery which it included in it as standard equipment. In addition to this main battery, a "sub-battery", which is an optional expansion battery, is used in some electric apparatuses. Conventionally, these electric apparatuses using a sub-battery besides the main battery discharges the sub-battery first, then, after remaining charge in the sub-battery becomes 0% (nearly 0%) of full charge, switches to the main battery and discharges the main battery until its remaining charge becomes 0% (nearly 0%).

Typically, square lithium ion cells are used in a sub-battery, for example. The sub-battery using lithium ion cells has high internal resistance and contains a fuse and therefore a large discharge current may cause high self-heating. In recent years, the maximum power consumption in a notebook PC has increased. When a program that places system hardware such as its CPU in full operation is executed, a discharge may cause an excessive rise in temperature. In such a case, a protect function may be activated in order to protect the apparatus against the excessive temperature rise in the battery cells and as a result, the apparatus may shut down.

Figure 6:
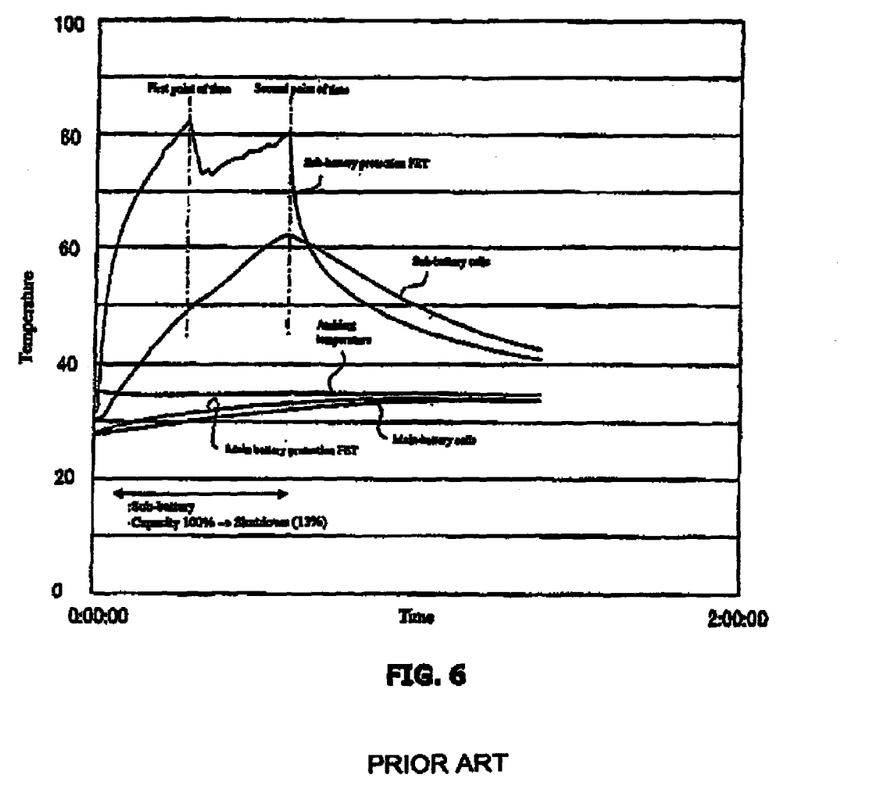
FIG. 6 shows temperature data during discharge according to the background art.
Figure 7:
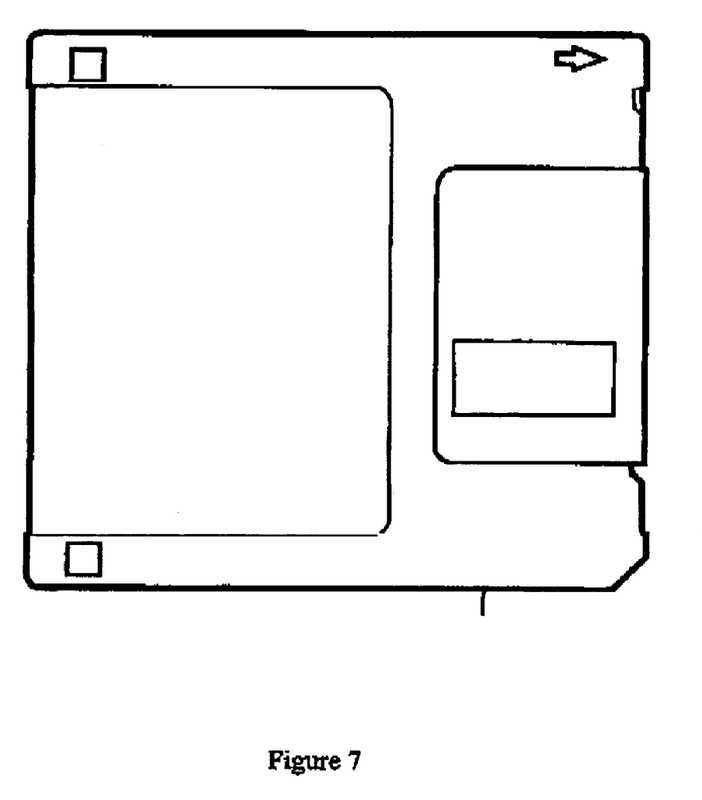
FIG. 7 shows a computer readable disc with the program hereof thereon.

FIG. 6 shows data on temperatures during discharging according to a background art. The horizontal axis indicates time and the vertical axis indicates temperatures. Shown in FIG. 6 are data on temperatures in a sub-battery protection FET, sub-battery cells, main battery protection FET, and main-battery cells, and ambient temperature.

Assumption here is that the CPU is operating in normal mode and a current of 5,500 mA flows from the battery cells. The maximum power consumption of the CPU is high and the temperature of the sub-battery protection FET and sub-battery cells rises with time. It can be seen that at the first point of time in FIG. 6 the CPU enters low-speed mode because of an excessively large current, resulting in reduction in performance. As a result, the temperature of the sub-battery protection FET drops temporarily but then continues to rise. On the other hand, the temperature rise slope of the sub-battery cells becomes slightly gentle after the first point of time but continues to rise. At the second point of time at which the temperature exceeds 60Â° C. (at the point where it rises to 63Â° C., for example), a protect circuit within the battery may be activated to shut off power supply from the sub-battery to the system. Such unexpected shutoff of power supply from the sub-battery to the system is undesirable.

The present invention has been made in order to solve the problem and a purpose of the present invention is to prevent shutoff of electric power supply from a battery to a system.

Another purpose of the present invention is to prevent shutdown of a plurality of separate battery units and use them to the fullest.

BRIEF SUMMARY OF THE INVENTION

To achieve these purposes, the present invention stops discharge of a first battery, which is a "sub-battery", and starts discharge of a second battery, which is a main battery, when the temperature of cells of the sub-battery becomes high due to discharge of the sub-battery. That is, an electronic apparatus to which the present invention is applied comprises a first battery for supplying electric power to a main body by discharging after charging thereof; a second battery being comprised of another unit different from the first battery and supplying electric power to the main body; a controller for stopping supply of electric power by the first battery to switch to supply of electric power to said main body by said second battery when said electric power is supplied to said main body under the condition that a temperature of said first battery exceeds a predetermined temperature.

The controller of the electric apparatus to which the present invention is applied presets a predetermined temperature just below a temperature at which a protect circuit such as a FET is activated. The controller monitors the temperature of the cells in the first battery in discharge. If the monitored temperature of the cells exceeds the predetermined temperature, the controller switches to an attached second battery before the protect circuit is activated to shut down the system (main body). The controller can stop power supply from the first battery and causes the second battery to supply to the main body when the remaining capacity of the first battery decreases below a predetermined value.

The electric apparatus to which the present invention is applied comprises means for monitoring the temperature of a battery supplying electric power to a main body to which it is connected; means for monitoring the remaining capacity of the battery; means for making switchover to electric power supply from a different electric power source different from the battery connected to the main body if the temperature of the battery monitored by the temperature monitor means exceeds a predetermined temperature and the remaining capacity monitored by the remaining capacity monitor means decreases below a predetermined capacity; and means for presenting an alarm message to a user if no electric power sources can discharge.

The switching means can switch to power supplied by the battery if another battery, which is the different power source mentioned above, becomes exhausted after supplying electric power by the different battery to said main body. The term "exhausted" refers to not only a state in which the battery is fully exhausted but also to a state in which a small amount of capacity remains but the battery is practically "exhausted", or nearly exhausted, and cannot function to supply power to the main body.

According to the present invention, a power supply (such as an AC adapter) connected to a commercial electric power source may be contemplated as another power source. If for some reason power is supplied from a battery to the main body under the condition that a power supply such as an AC adapter is connected to the main body, discharge from the battery is stopped and switchover to discharge from the power supply such as the AC adapter is made based on a rise in temperature of the battery, for example.

According to the present invention, there is provided a computer apparatus arranged such that a rechargeable or charge-discharge main battery and a rechargeable or charge-discharge sub-battery can be connected to it, comprising temperature monitor means for monitoring the temperature of a sub-battery that is discharging; remaining capacity monitor means for monitoring the remaining capacity of the sub-battery; and battery switching means for switching from the sub-battery to the main battery for receiving electric power supply from the main battery if the temperature monitored by the temperature monitor means exceeds a predetermined temperature and the remaining capacity monitored by the remaining capacity monitor means decreases below a predetermined capacity. The predetermined temperature may be 60° C. for example if only the temperature condition is monitored, or the temperature may be 55° C. for example and the predetermined capacity may be 20% if the remaining capacity is also monitored.

The computer may further comprise determination means for determining whether the remaining capacity of the main battery is substantially exhausted after the computer receives power supply from the main battery through switching by the battery switching means. The battery switching means makes switchover to the sub-battery for receiving power supply from the sub-battery if the determination means determines that the remaining capacity of the main battery is substantially exhausted.

From another point of view, the computer according to the present invention comprises first connection means capable of connecting a first battery unit; second connection means capable of connecting a second battery unit different from the first battery unit; discharge transferring means for transferring to discharge from the second battery unit by using the second connection means before a protection facility of the first battery unit is activated to stop power supply to the system; and execution means for executing a predetermined suspend process if the first and second battery units are no longer dischargeable.

The discharge transferring means detects the temperature and remaining capacity of a battery cell in the first battery unit and, if predetermined conditions are met, transfers to discharge from the second battery cell. The predetermined conditions may be that the detected temperature of the battery cell is 55° C. or higher and the remaining capacity is 20% or less, for example. The effective conditions under which a protection circuit is activated may be that the temperature of the battery cell is 63° C. and the remaining capacity is 13%, for example.

A controller according to the present invention comprises monitor means for monitoring the temperature and remaining capacity of a battery cell in a first battery unit connected to a system main body for discharging to the system main body; and switching means for making switchover to discharge from a second battery unit connected to the system main body if the temperature monitored by the monitor means exceeds a predetermined value and the remaining capacity decreases below a predetermined value.

According to the present invention, there is provided a battery switching method for switching between a plurality of battery units connected to a main body to supply electric power to the main body, comprising the steps of: detecting the cell temperature of the battery unit that is discharging; comparing the detected cell temperature with a temperature predetermined based on the operating temperature of a battery protection facility; and making switchover to discharge from another battery unit based on the result of the comparison. The method may further comprise the steps of: detecting the remaining capacity of the battery unit that is discharging; and making switchover to discharge from the another battery unit if the detected capacity is less than a predetermined capacity predetermined based on the battery protection facility. The method may further comprises the step of executing a predetermine suspend process if the temperatures of all of the plurality of battery units exceed the predetermined temperature and the remaining capacities of all of the plurality of battery units are less than the predetermined capacity.

Furthermore, the present invention may be characterized by a battery switching method for switching between electric power supply from a commercial power source to which a main body is connected and a battery unit to which the main body is connected to supply of electric power to the main body, comprising the steps of: supplying electric power to the main body by discharge from the battery unit to which the main body is connected under the condition that the power supply is connected to the main body; and stopping discharge from the battery unit and making switchover to discharge from the power supply if the cell temperature of the battery unit that is discharging exceeds a predetermined temperature.

The present invention can be contemplated as a program executed by a computer. The present invention is characterized by a program for causing a computer to which a plurality of battery units can be connected to implement the functions of: detecting the cell temperature of one of the plurality of battery units that is discharging; presetting a reference temperature determined based on a condition under which battery protection is activated and storing the reference temperature in a memory; comparing the detected cell temperature with the stored reference temperature; and making switchover to discharge from another battery unit connected if the cell temperature exceeds the reference temperature. The program further causing the computer to implement the functions of: detecting the remaining capacity of the battery unit that is discharging; presetting a reference capacity determined based on a condition under which battery protection is activated and storing the reference capacity in the memory; comparing the detected remaining capacity with the stored reference capacity; and making switchover to discharge from another battery unit connected if the remaining capacity is less than the reference capacity.

The program to be executed by a computer may be provided as a recording medium on which it is stored in a computer readable form. The storage medium may be a floppy disk or a CD-ROM, for example. The program may be read by a floppy disk drive or a CD-ROM reader, stored in a memory such as a flash ROM, and executed by the computer.

Alternatively, the program may be provided by a program transmission device to a notebook computer over a network, for example. The program transmission device may be provided in a server at a host site and may include a memory for storing the program and program transmission means for providing the program over the network. Furthermore, the program may be preinstalled in a computer and provided to a user when the computer is provided to the user.

BRIEF DESCRIPTION OF THE SEVERAL VIEWS OF THE DRAWINGS

Some of the purposes of the invention having been stated, others will appear as the description proceeds, when taken in connection with the accompanying drawings, in which.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
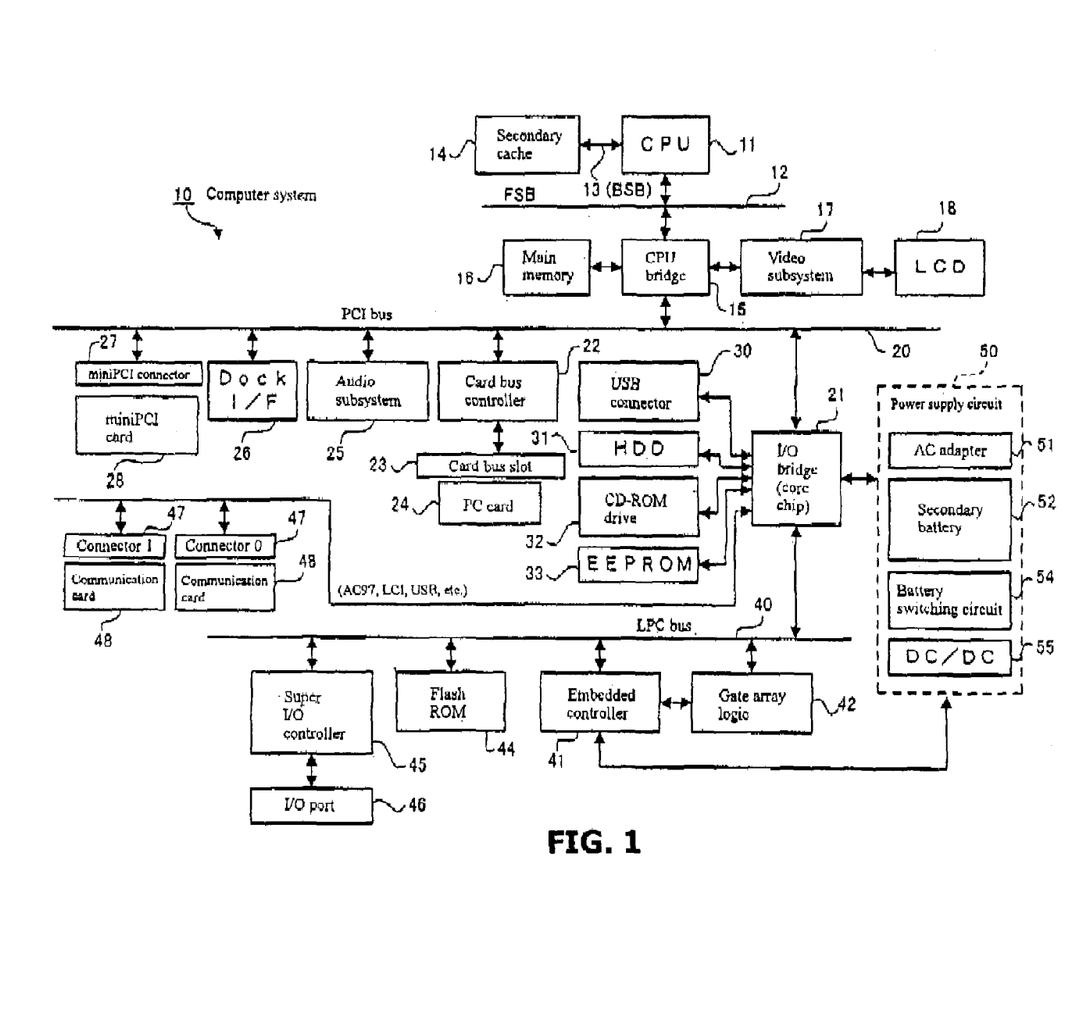
FIG. 1 shows a hardware configuration of a computer system, which is an electric apparatus to which the present embodiment is applied.

Referring now more particularly to the accompanying drawings, FIG. 1 shows a hardware configuration of a computer system 10, which is an electric apparatus to which the present embodiment is applied. A computer apparatus including this computer system 10 (hereinafter sometimes simply referred to as the "system") may be a notebook personal computer (notebook PC) that is compliant with OADG (Open Architecture Developer's Group) specifications and includes a given operating system (OS).

A CPU 11 in the computer system 10 shown in FIG. 1 functions as the brain of the entire computer system 10 and executes programs, including a utility program, under the control of the OS. The CPU 11 is interconnected with components of the computer system 10 through three busses: a FSB (Front Side Bus) 12, which is a system bus, a PCI (Peripheral Component Interconnect) bus 20, which is a fast I/O device bus, and an LPC (Low Pin Count) bus 40, which is an I/O device bus. The CPU 11 stores program codes and data in a cache memory to facilitate fast processing. In recent years, a CPU 11 incorporates 128K bytes or so of SRAM memory as a primary cache. In order to make up for a shortage of memory capacity, 512K to about 2M of secondary cache 14 is provided through a BSB (Back Side Bus) 13, which is a dedicated bus. The BSB 13 may be omitted and the secondary cache 14 may be connected onto the FSB 12, thereby avoiding an increase in the number of terminals in the package to reduce costs.

The mode of the CPU 11 used in the present embodiment can be controlled. For example, the CPU 11 can operate in normal mode and low-speed mode (low power mode). To lower the operating speed of the CPU 11, SpeedStep technology (which lowers the operating frequency and voltage of a processor) from Intel in the U.S.A. or throttling technology (which periodically turns on/off a processor to in effect reduce operating frequency), for example, may be used. By causing the CPU 11 to operate in low power mode, the clock frequency of the CPU 11 can be reduced from a normal frequency of 850 MHz to 750 MHz and the voltage of the CPU 11 can be decreased from a normal voltage of 1.6 V to 1.35 V, for example.

The FSB 12 and the PCI bus 20 are connected with each other via a CPU bridge (host-PC bridge) 15 called a memory/PCI chip. The CPU bridge 15 includes a memory controller function for controlling access to the main memory 16 and a data buffer for accommodating the difference in data transfer rate between the FSB bus 12 and the PCI bus 20. The main memory 16 is writeable memory which is used as an area in which programs to be executed by the CPU 11 are loaded or a working area into which data is to be processed by the execution programs. The main memory 16 may be composed of a number of DRAM chips, for example, originally it may have 64 MB of memory capacity, and be expandable to 320 MB of memory. The execution programs includes an OS, drivers for operating hardware peripherals, application programs designed for specific tasks, and firmware such as BIOS (Basic Input/Output System) stored in a flash ROM 44, which will be described later.

A video subsystem 17 is a subsystem for implementing functions concerning video and includes a video controller. The video controller processes image instructions from the CPU 11 and writes image information resulting from the processed instructions into video memory. It reads the image information from the video memory and outputs it as image data on a liquid crystal display (LCD) 18.

The PCI bus 20 is capable of transferring data at a relatively fast speed. The PCI bus 20 is a standardized bus conforming to specifications of a width of 32 or 64 bits, a maximum operating frequency of 33 MHz or 66 MHz, and a maximum data transfer rate of 132 MB/second or 528 MB/second. Connected onto the PCI bus 20 are, an I/O bridge 21, a Card Bus controller 22, an audio subsystem 25, a docking station interface (Dock I/F) 26, and mini PCI connector 27.

The Card Bus controller 22 is a dedicated controller for directly coupling a bus signal on the PCI bus 20 to the interface connector (Card Bus) of a Card Bus slot 23. A PC Card 24 can be connected to the Card Bus slot 23. The docking station interface 26 is hardware to which a docking station (not shown), which is a functionality expansion device for the computer system 10, is to be attached. When the notebook PC is set in the docking station, hardware components connected onto an internal bus in the docking station are connected to the PCI bus 20 through the docking station interface 26. A mini PCI card 28 is connected to the mini PCI connector 27.

The I/O bridge 21 has a bridge function between the PCI bus 20 and the LPC bus 40. It also has a DMA controller function, programmable interrupt control (PIC) function, programmable interval timer (PIT) function, IDE (Integrated Device Electronics) interface function, USB (Universal Serial Bus) function, and SMB (System Management Bus) interface function and contains a real time clock (RTC).

The DMA controller function is the function of providing data transfer between a peripheral device such as FDD and the main memory 16 without the intervention of the CPU 11. The PIC function is the function of causing a predetermined program (interrupt handler) to be executed in response to an interrupt request (IRQ) from a peripheral device. The PIT function is the function of generating a timer signal at predetermined intervals. The IDE interface function implements an interface to which an IDE hard disk drive (HDD) 31 is connected and also a CD-ROM drive 32 is connected using ATAPI (AT Attachment Packet Interface). IDE devices of other types such as a DVD (Digital Versatile Disc) drive may be connected instead of the CD-ROM drive 32. The external storage devices such as the HDD 31 and CD-ROM drive 32 are installed in an area called a "media bay" or "device bay" in the main body of the notebook PC. In some cases, the external storage devices included as standard equipment may be attached interchangeably and mutually exclusively with another device such as an FDD or battery pack.

A USB port is provided in the I/O bridge 21. The USB port is connected with a USB connector 30 provided for example in a wall of the main body of the notebook PC. Also connected to the I/O bridge 21 is an EEPROM 33 through the SM bus. The EEPROM 33 is memory for holding information such as a password or supervisor password registered by a user and the serial number of the product. The EEPROM 33 is nonvolatile and can be electrically everwritten. A plurality of connectors 47 are connected to the I/O bridge 21 through an AC 97 (Audio CODEC '97) supporting modem functionality, an LCI (LAN Connect Interface) containing in a core chip for interfacing to Ethernet, a USB, and the like. A communication card can 48 be connected to each of the plurality of connectors 47.

The I/O bridge 21 connected also to a power supply circuit 50. The power supply circuit 50 includes an AC adapter 51 to be connected to an AC 100 or 115 V commercial power source for performing AC/DC conversion, a secondary battery 52, which is repeatedly charged and discharged and may be a nickel metal hydride battery or nickel cadmium battery, lithium ion battery, or lithium polymer battery, a battery switching circuit 54 for switching between the AC power from the AC adapter 51 and battery power from the secondary battery 52, a DC/DC converter for generating a direct current constant voltage of +15 V, +5 V, +3.3 V or so used in the computer system 10, and other circuits. The secondary battery 52 is an intelligent battery containing a CPU and communicating with an embedded controller 41 (which will be described later) according to the SBS (Smart Battery System) specifications, for example.

Provided in the core that forms the I/O bridge 21 are an internal register for managing power in the computer system 10 and a logic (state machine) for power management in the computer system 10, including control of the internal register. The logic sends and receives signals to and from the power supply circuit 50 to recognize the actual status of power supply from the power supply circuit 50 to the computer system 10. The power supply circuit 50 controls power supply to the computer system according to directions from this logic.

The LPC bus 40 is an interface standard designed for connecting a legacy device to a system having no ISA bus. It communicates commands, addresses, and data the same four signal lines (LAD signals) at an operating clock of 33 MHZ (for example, 8-bit data is transferred by 4 bits, 2 clocks). Connected on the LPC bus 40 are the embedded controller 41, a gate array logic 42, a flash ROM 44, and a Super I/O controller 45. The LPC bus 40 is also used for connecting peripherals such as a keyboard and mouse controller that operate at relatively low speeds. An I/O port 46 is connected to the Super I/O controller 45 for controlling the drive of an FDD, input and output of parallel data (PIO) through a parallel port, and input and output of serial data (SIO) through a serial port.

The embedded controller 41 controls a keyboard, not shown, and is connected to the power supply circuit 50 to provide part of power management functionality using a power management controller (PMC) contained in the embedded controller 41 in combination with the gate array logic 42.

Figure 2:
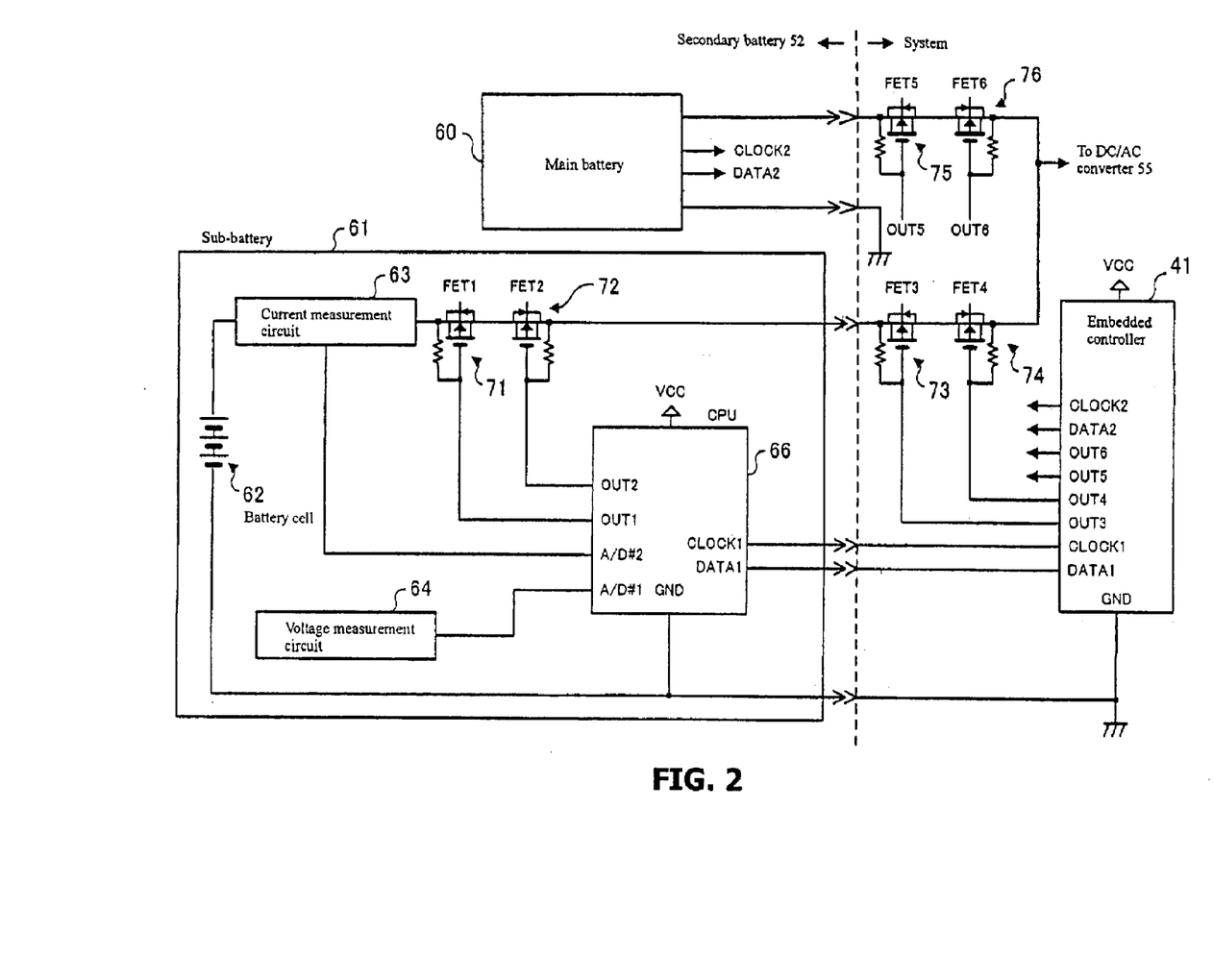
FIG. 2 shows a power supply circuit to which the present embodiment is applied.

FIG. 2 shows a power supply circuit to which the present embodiment is applied. The secondary battery 52 side and system side of the circuit are shown in FIG. 2. Provided on the secondary battery 52 side are a main battery 60, which is a first battery unit, and a sub-battery 61, which is a second battery unit. Some notebook PCs may be originally equipped with a battery pack as the main battery 60 and provided with a sub-battery 61 as an optional expansion battery. If the main battery 60 and sub-battery 61 are connected with each other in a notebook PC, typically (discharge from) the sub-battery 61 is used first and, when the remaining capacity of the sub-battery 61 becomes nearly zero (exhausted), the main battery 60 is used. This is because if the main battery 60 were discharged first (for example, if the sub-battery 61 is removed and another device (for example a CD-ROM) is attached after the main battery 60 is consumed), a problem such as a shortage of battery would occur.

As shown in FIG. 2, the sub-battery 61, which is an intelligent battery, comprises battery cells 62, which may be lithium ion cells, a current measurement circuit 63 for measuring the value of a current charged into and discharged from the battery cells 62, a voltage measurement circuit for detecting the voltage of the battery cells 64, a CPU 66, which is a microcomputer for controlling the second cell 61, a first FET (Field Effect Transistor) 71, which is a discharge stopping transistor for protecting the sub-battery 61 against abnormal discharge, and a second FET 72, which is a charge stopping transistor for protecting the sub-battery 61 against abnormal charging. Fuses are provided within the battery cells 62 for protecting the system against an abnormal current flow. These fuses are protect elements of a type that melts to shutoff power if an overcurrent flows. These fuses cannot recovers once they have operated (melted). The CPU 66 receives the result of the detection from a current measurement circuit 63 and voltage measurement circuit 64 to know the capacity of the battery cell 62. The CPU 66 uses a temperature sensor (not shown) provided in the vicinity of the battery cells 62 to know the temperature of the battery cell 62. The obtained information is provided to the embedded controller 41 in a data format compliant to SBS, for example. A configuration similar to that of the sub-battery 61 shown in FIG. 2 is provided for the main battery 60. Instead of the FET, a PTC (Positive Temperature Coefficient) thermistor having resistance that drastically changes as its temperature exceeds a certain temperature may be used as a protective element.

The system side shown in FIG. 2 includes a third and fourth FETs 73 and 74 which are controlled by the embedded controller 41 to switch between charge and discharge of the sub-battery 61. It also includes a fifth and sixth FETs 75 and 76 which are controlled by the embedded controller 41 to switch between charge and discharge of the main battery 60. When discharging the sub-battery 61, the embedded controller 41 turns on the third and fourth FETs 73 and 74 and turns off the fifth and sixth FETs 75 and 76. The embedded controller 41 outputs Low through its OUT3 and OUT4 terminals and Hi-Z (OPEN) through its OUT5 and OUT 6 terminals.

Taking the sub-battery 61 as an example, the first and second FETs 71 and 72 in the sub-battery 61 are normally set at on by the CPU 66. When the temperature of the battery cells 62 increases, the CPU 66 turns off the first FET 71 in order prevent damage to the battery cells 62 due to blowout of fuses within the battery cells 62. For example, if the temperature of the battery cells 62 increases to 63° C., its discharge current becomes 4,700 mA, and its remaining capacity decreases to 13%, the CPU 66 activates the protection circuit of the battery. As a result, the power supply from the sub-battery 61 to the system side is shut off, resulting in shutdown of the system. The present embodiment addresses the problem by improving the power supply method so that the sub-battery 61 and main battery 60 are fully consumed.

Figure 3:
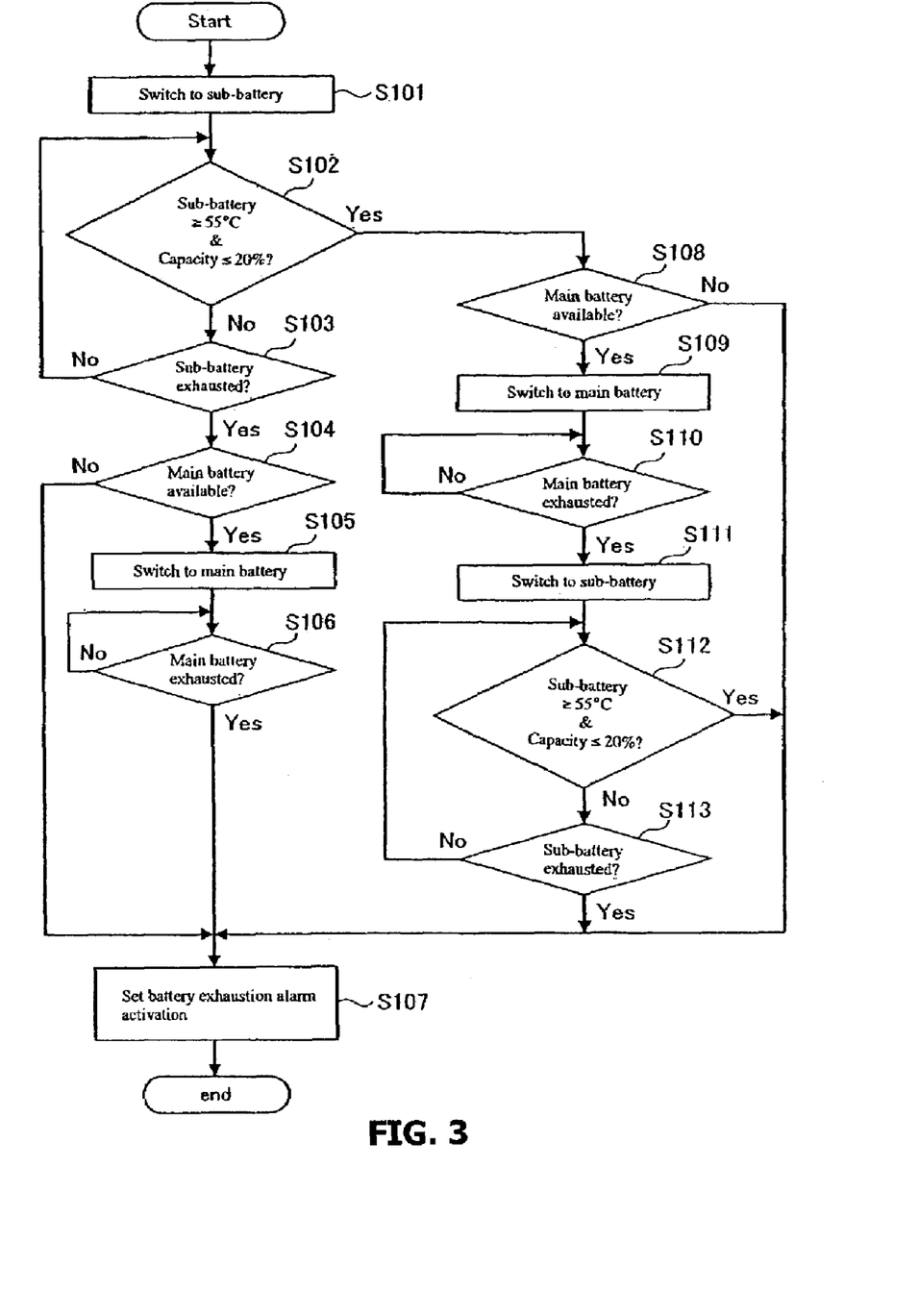
FIG. 3 show a flowchart of a process of a power supply method to which the present embodiment is applied.

FIG. 3 shows a flowchart of a power supply process according to the present embodiment. In this process, when the temperature of the sub-battery 61 does not become high and the battery capacity (remaining capacity) is not low, the sub-battery 61 is first discharged, then the main battery 60 is discharged, and finally a shutdown operation (activation of a battery exhaustion alarm) is performed. First, the embedded controller 41 outputs Low through OUT3 and OUT4 terminals and Hi-Z (OPEN) through OUT5 and OUT 6 terminals and turns on the third and fourth FETs 73 and 74 and off the fifth and sixth FETs 75 and 76 to start discharging from the sub-battery 61 (step 101). Then, it determines based on information obtained from the CPU 66 of the sub-battery 61 whether the temperature of the sub-battery 61 is as high as over 55° C. and the remaining capacity is as low as 20% or less (step 102). If so, the embedded controller 41 switches from the sub-battery 61 to the main battery 60, and proceeds to step 108. On the other hand, if the conditions at step 102 are not met, it determines that discharge from the sub-battery 61 can be continued and proceeds to step 103 and the subsequent steps.

Determination at step 102 is based on not only a temperature rise but also the remaining capacity of the battery. The fuse provided in the battery cells 62 typically blows depending on the relationship between the temperature and the current value of the battery. Therefore, ideally the discharge current value as well as the temperature should be observed and the switching between the batteries should be performed based on these values. However, typically increases and decreases in the current value are frequently repeated and therefore it is difficult to determine an accurate discharge current. On the other hand, as the remaining capacity of the battery decreases, the voltage decreases and the current value increases accordingly. Therefore, simply the remaining capacity is observed instead of the current value and, depending on the temperature of the discharging battery and the observed remaining capacity, a changeover from the discharging battery to the other is made, according to the present embodiment. The predetermined temperature, 55° C., and the capacity, 20% at step 102 are determined based on a cell temperature of 63° C., a discharge current of 4,700 mA, and a remaining capacity of 13%, at which the protection function of the battery is activated to stop discharge to the system. If only the temperature condition is observed, it is determined whether the temperature of the battery exceeds 60° C.

If the conditions at step 102 are not met, it is determined whether or not the sub-battery 61 becomes empty (nearly empty) (step 103). If it is not exhausted, the process returns to the determination at step 102. On the other hand, if it is exhausted, it is determined whether or not the main battery 60 is available (step 104). If it is not available, the battery exhaustion alarm is activated (step 107), then the process ends. If the main battery 60 is available, the embedded controller 41 outputs Hi-Z (Open) through the OUT3 and OUT4 and LOW through the OUT5 and OUT6 terminals and turns off the third and fourth FETs 73 and 74 and on the fifth and sixth FETs 75 and 76 to switch to the main battery 60 (step 105). Then, it continues discharge from the main battery 60 until it becomes empty (nearly empty) (step 106), then the process ends through step 107.

On the other hand, if the conditions at step 102 are met, it is determined whether or not the main battery 60 is available (step 108). If it is not available, the process ends through step 107. If the main battery 60 is available, changeover to the main battery 60 is made (step 109) and discharge from the main battery 60 is continued until it becomes empty (nearly empty) (step 110). After the main battery 60 becomes empty (nearly empty), changeover to the sub-battery 61 is made (step 111), then it is determined whether or not the same temperature and battery capacity (remaining capacity) conditions as in step 102 are restored (step 112). If the conditions at step 112 are met, the process ends through step 107. On the other hand, if the temperature and remaining capacity conditions are restored, it is determined whether or not the sub-battery 61 is empty (nearly empty) (step 113). If it is not empty (not nearly empty), then the sub-battery 61 is discharged to the extent where the conditions at step 112 are not met. When it becomes empty (nearly empty), then the process ends through step 107.

While the determination is made based on the remaining capacity as well as the temperature in the process in FIG. 3, the battery unit switching may be made simply based on the temperature condition alone. For example, if the temperature of the sub-battery 61 becomes high (for example over 60° C., or 62° C. or 65° C. depend on the types of the batteries), changeover to the operation on the main battery 60 is made. If the temperature of the secondary battery 61 decreased below 60° C., for example, after the main battery 60 is discharged, then the remaining capacity of the sub-battery 61 is discharged and eventually shutoff operation is performed.

Figure 4:
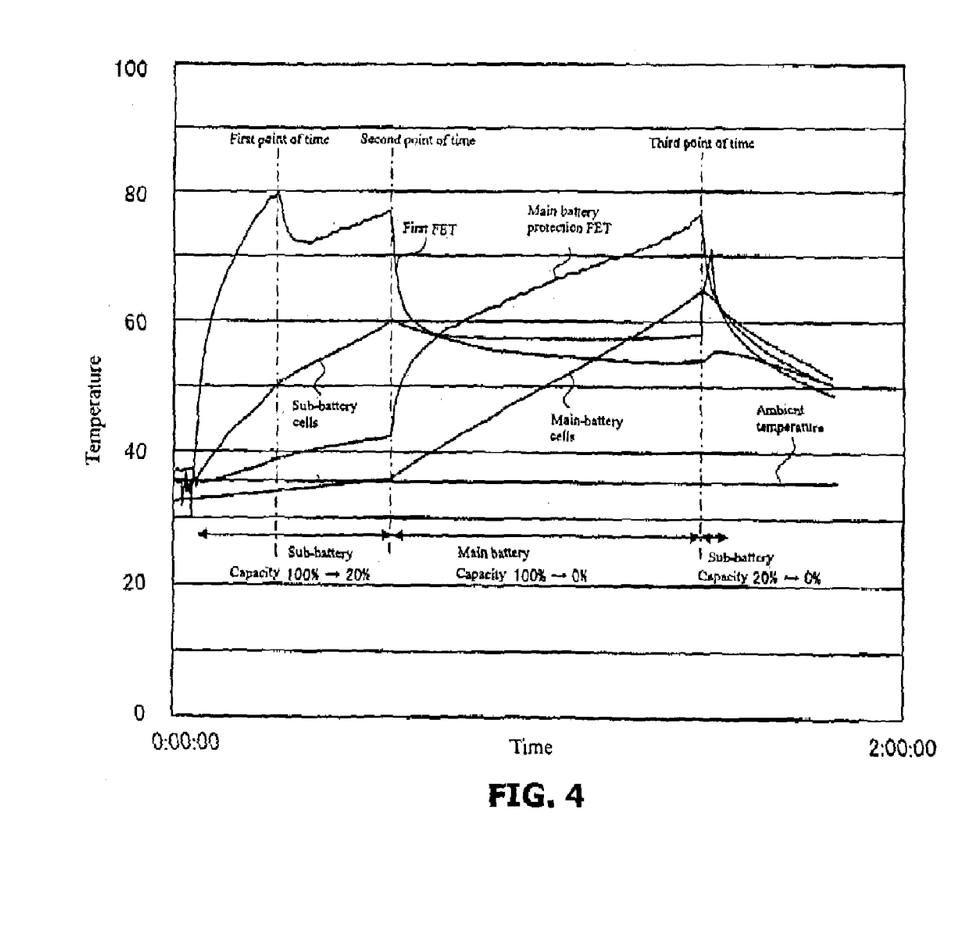
FIG. 4 shows temperature data during discharge in a case where the power supply method according to the present embodiment is used.

FIG. 4 shows temperature data during discharging by using the power supply method according to the present embodiment. The horizontal axis indicates time and the vertical axis indicates temperature. Shown in FIG. 4 are data on the temperature of first FET 71, which is the protection FET of the sub-battery 61, data on the temperature of the battery cells 62 of the sub-battery 61, data on the temperature of the protection FET of the main battery 60, data on the temperature of the battery cells of the main battery 60, and the ambient temperature.

The CPU 11 in the computer system 10, which receives discharge from the sub-battery 61, first operates in normal mode, and a current of approximately 5,500 mA is supplied to the CPU 11. At the first point of time, the computer system 10 reduces the performance of the CPU 11 to switch to low power mode in which the current value is reduced to approximately 4,700 mA. As a result, the temperature of the first FET 71 temporarily decreases and, after a period of time, rises. On the other hand, the temperature of the battery cells 62 of the sub-battery 61 continues to increase. The temperature would continue to rise until the protection FET shuts down according to the background art as shown in FIG. 6. In the power supply method according to the present embodiment by contrast, the temperature of the battery cells 62 of the sub-battery 61 is monitored and, when it reaches 60° C., for example, (at the second point of time in FIG. 4), the embedded controller 41 on the system side stops the discharge from the sub-battery 61 and switches to discharge from the main battery 60. The remaining capacity of the sub-battery 61 at this time point is reduced to 20% from 100%.

As a result of the switch to the discharge from the main battery 60 at the second point of time, the temperature of the first FET 71 of the sub-battery 61 rapidly decreases and the temperature of the battery cells 62 also decreases. Then, when the remaining capacity of the main battery 60 decreases from 100% to nearly 0% (at the third point of time), the embedded controller 41 switches from the discharge from the main battery 60 to discharge from the sub-battery 61. The switching at the third point of time is performed based on the precondition that the temperature of the battery cells 62 of the sub-battery 61 is lower than 60Â° C. In this way, this power supply method can prevent shutdown of the system while allowing the sub-battery 61 and main battery 60 to be fully consumed.

Figure 5:
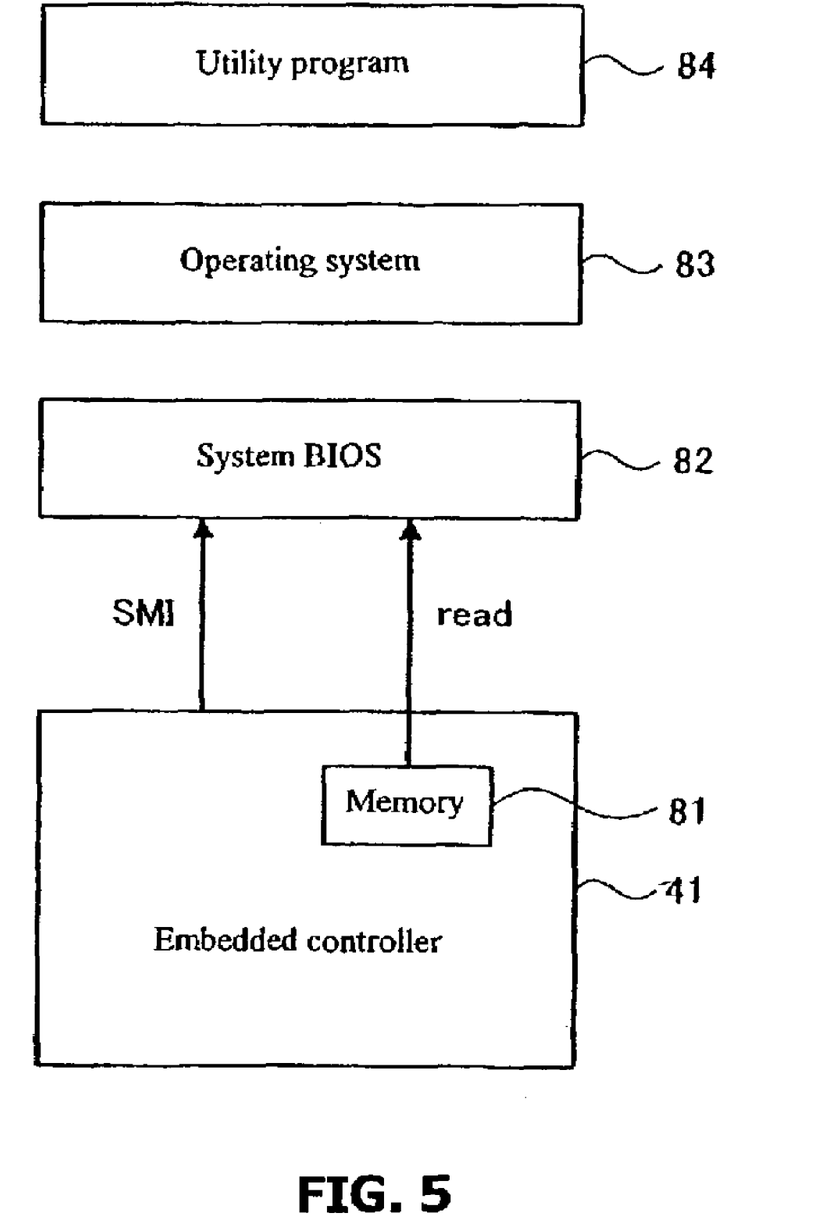
FIG. 5 shows a configuration for implementing an interface with a user.

FIG. 5 shows a configuration for implementing an interface with a user. The embedded controller 41 includes a memory 81 for storing commands to be set. The system includes a system BIOS (Basic Input/Output system) 82, which is a basic input/output system for controlling the embedded controller 41, an operating system (OS) 83 for providing the system management of the system 10 and a basic user operating environment, and a-utility program 84 for presenting messages to the user, all these components enabling an interface with the user.

An operation in a case where no dischargeable batteries are available will be described below.

An operation for providing an alarm will be described first. When the embedded controller 41 recognizes that the remaining battery capacity decreases to 20%, for example, it sets 0x'4E' in the memory 81 to cause an SMI (System Management Interrupt). The system BIOS 82 reads the value set by the embedded controller 41 in the memory 81. When the system BIOS 82 reads preset 0x'4E', it generates an alarm sound and the utility program 84 displays an alarm message. For example, the alarm message displayed may be "The system will enter suspend mode due to overheating."

An operation for stopping discharge will be described. When the embedded controller 41 recognizes that the remaining capacity decreases to 19% or less, it sets 0x'4F' in the memory 81 to cause an SMI. The system BIOS 82 reads the value set by the embedded controller 41 in the memory 81. When the system BIOS 82 reads the set 0x'4F', it performs an operation (suspend/hibernation) set by the user.

In this way, the temperature of the cells of a discharging battery is detected, or both of the temperature of the cells and the remaining capacity of the battery unit are detected, and if the temperature of the discharging cells exceeds 60Â° C., for example, or the cell temperature exceeds 55Â° C. and the remaining capacity decreases to less than 20%, switchover from the discharge from the battery that meets these conditions to discharge from another attached battery unit is accomplished according to the present embodiment. If all the battery units meet these conditions, or the battery units become empty and no battery units are available for discharging, an operation set by the user is performed. These arrangements prevent sudden shutdown of the system and allow a plurality of battery units to be fully consumed.

While the present embodiment has been described with respect to an example in which the two batteries, the main battery 60 and sub-battery 61, are used, a detection and switching process similar to the process described above can be applied to three or more batteries. The plurality of batteries are not limited to those batteries contained in separate housings. The present invention can be applied to a case where one battery is divided into a plurality of units and used. While the notebook PC has been used as an example of the electric apparatus in the present embodiment, the method of the embodiment may be applied to other electric apparatus While the embodiment has been described in which the two batteries, the main battery 60 and sub-battery 61, are used, the present invention can be applied to a case in which one secondary battery 52 is used and at the same time an AC adapter 51 is connected to the system. For example, a system may be controlled to receive power supplied from the secondary battery 52 even when the AC adapter 51 is connected, in order to reduce peak power during periods of extremely high electricity demand. In such a case, if the second battery 52, which is the only secondary battery that can discharge, becomes unable to discharge due to a rise in its temperature, power can be supplied from discharge from the AC adapter 51 to prevent sudden shutdown of power supply.

In the drawings and specifications there has been set forth a preferred embodiment of the invention and, although specific terms are used, the description thus given uses terminology in a generic and descriptive sense only and not for purposes of limitation.

What is claimed is:

1. An electric apparatus comprising:
  a first battery having a variable temperature and a given capacity which supplies electric power to an electrically driven device, said first battery being a rechargeable battery having a temperature sensor which provides an indication of the temperature of said first battery;
  a second battery, different from said first battery, which supplies electric power to said electrically driven device;
  a controller which couples said first and second batteries and which switches the supply of electric power to said electrically driven device by stopping the supply of electric power by said first battery and starting the supply of electric power by said second battery in response to a temperature indication by the temperature sensor which exceeds a predetermined temperature, and
  wherein said controller monitors the capacity of said first battery and performs the switching in response to a further condition of detecting a capacity which is below a predetermined capacity.

2. Apparatus of claim 1, wherein the predetermined temperature is preset as a temperature over which a protection circuit in said first battery is activated.

3. An electric apparatus comprising:
  an electrically driven device;
  a temperature monitor which monitors temperature of a first battery having a given capacity which supplies electric power to said electrically driven device;
  a switch, operatively coupled to said electrically driven device and to said temperature monitor, which switches the supply of electric power to an other electric power source to said electrically driven device different from the first battery in response to a temperature as monitored by said temperature monitor exceeding a predetermined temperature;
  a remaining capacity monitor which is coupled to said electrically driven device and which monitors the remaining capacity of the first battery; and
  wherein said switch further switches to the electric power supplied by the other electric power source in response to monitoring a remaining capacity in said first battery which is below a predetermined capacity.

4. Apparatus of claim 3, wherein the other electric power source is a second battery different from the first battery and wherein said switch switches to the electric power supplied by the first battery to the electrically driven device if the second battery becomes exhausted after supplying electric power to the electrically driven device.

5. Apparatus of claim 4, further comprising:
a display which is coupled to said electrically driven device and which displays an alarm message if no dischargeable battery is available.

6. Apparatus of claim 3, wherein the other electric power source is an electric power supply which provides a connection to a commercial electric power source.

7. A computing apparatus comprising:
a main unit equipped to be able to receive electric power from a main battery and a sub-battery, both the main battery and the sub-battery each having a variable temperature and being a charge-discharge battery;
a temperature monitor operatively coupled to said main unit which monitors the temperature of the sub-battery under discharge;
a battery switch, housed within said main unit, which switches to the main battery from the sub-battery and which receives electric power supplied by the main battery when a temperature as monitored by said temperature monitor exceeds a predetermined temperature;
a remaining capacity monitor which is coupled to the main unit and which monitors the remaining capacity of the sub-battery; and
wherein said battery switch switches from the sub-battery to the main battery thereby receiving electric power supplied by the main battery if a remaining capacity as monitored by said remaining capacity monitor is below a predetermined capacity.

8. Apparatus of claim 7, wherein the predetermined temperature is 60° C.

9. Apparatus of claim 7, further comprising:
a detector, coupled to the main unit, which determines whether the remaining capacity of the main battery is substantially exhausted after said main unit receives electric power supplied by the main battery through switching by said battery switch;
wherein said battery switch switches to the sub-battery and receives electric power supplied by the sub-battery if said detector determines that the remaining capacity of the main battery is substantially exhausted.

10. A computing apparatus, comprising:
a first connector which provides connection to a first battery unit having a variable temperature;
a second connector which provides connection to a second battery unit constructed as a different unit from the first battery unit;
a discharge transfer circuit which couples said first and second connectors and which transfers discharge to the second battery unit provided on said second connector prior to termination of electric power supplied to a system by activating a protection function disposed to the first battery unit when receiving said discharge from the first battery unit provided on said first connector; and
wherein said discharge transfer circuit detects the temperature and remaining capacity of a battery cell in the first battery unit provided on said first connector and, if predetermined conditions are met transfers to discharge from the second battery unit provided on said second connector.

11. Apparatus of claim 10, wherein the predetermined conditions are that the detected temperature of the battery cell is 55° C. or higher and the remaining capacity is 20% or less.

12. Apparatus of claim 10, further comprising:
a processor which is coupled to said discharge transfer circuit and which executes a predetermined suspend process if the first and second battery units provided on said first and second connectors are not dischargeable.

13. A battery switching method for switching batteries attached to an electrically driven device, comprising the steps of:
detecting a cell temperature of a battery unit having an operating temperature that is discharging electrical power to said electrically driven device having a plurality of battery units;
comparing the detected cell temperature with a temperature predetermined based on the operating temperature of a battery protection facility;
effecting a switchover to discharge from another battery unit based on the result of said comparison step; and
detecting a remaining capacity of the battery unit that is discharging;
wherein the switchover is further a function of said detected remaining capacity being less than a predetermined capacity which is based on the battery protection facility.

14. The battery switching method of claim 13, further comprising the step of:
executing a predetermined suspend process if the temperatures of all of the plurality of battery units exceed the predetermined temperature and the remaining capacities of all of the plurality of battery units are less than the predetermined capacity.

15. A program product comprising:
a computer usable storage medium having computer readable program code embodied therein for causing a computer to which a plurality of battery units can be coupled, the computer readable program code in said program product implementing functions of:
detecting cell temperature of one of the plurality of battery units that is discharging;
presetting a reference temperature determined bused on a condition under which battery protection is activated and storing said reference temperature in a memory;
comparing the detected cell temperature with the stored reference temperature;
effecting a switchover to discharge from another coupled battery unit if the cell temperature exceeds the reference temperature;
detecting remaining capacity of the battery unit that is discharging;
presetting a reference capacity determined based on a condition under which battery protection is activated and storing said reference capacity in the memory;
comparing the detected remaining capacity with the stored reference capacity; and
effecting a switchover to discharge from another coupled battery unit if the remaining capacity is less than the reference capacity.

* * * * *